US008845298B2

(12) United States Patent
Larsen et al.

(10) Patent No.: US 8,845,298 B2
(45) Date of Patent: Sep. 30, 2014

(54) DRIVING ARRANGEMENT FOR A PUMP OR COMPRESSOR

(75) Inventors: Andreas Børre Larsen, Nesbru (NO); Jan Martin Bendiksen, Drammen (NO); Trond Sjulstad, Svarstad (NO); Tor Helge Brandsæter, Hvittingfoss (NO); Ola Strand, Tolvsrød (NO); Christian Petersen, Barkåker (NO)

(73) Assignees: Ing. Per Gjerdrum AS, Nesbru (NO); Techni AS, Borre (NO)

( * ) Notice: Subject to any disclaimer, the term of this patent is extended or adjusted under 35 U.S.C. 154(b) by 318 days.

(21) Appl. No.: 13/133,351

(22) PCT Filed: Dec. 8, 2009

(86) PCT No.: PCT/EP2009/066657
§ 371 (c)(1),
(2), (4) Date: Jun. 7, 2011

(87) PCT Pub. No.: WO2010/066754
PCT Pub. Date: Jun. 17, 2010

(65) Prior Publication Data
US 2011/0236236 A1 Sep. 29, 2011

(30) Foreign Application Priority Data
Dec. 8, 2008 (NO) .................................. 20085103

(51) Int. Cl.
*F04B 45/047* (2006.01)
*F04B 49/20* (2006.01)
(Continued)

(52) U.S. Cl.
CPC .............. *F04B 43/107* (2013.01); *H02K 7/108* (2013.01); *H02K 7/06* (2013.01); *F04B 43/04* (2013.01); *F04B 43/09* (2013.01); *H02K 5/132* (2013.01)
USPC .................................. 417/2; 717/42; 717/418

(58) Field of Classification Search
CPC ........... F04B 3/107; F04B 43/09; F04B 43/04

USPC ........... 92/136; 310/67 R, 75 R; 417/411, 16, 417/417, 2, 42
See application file for complete search history.

(56) References Cited

U.S. PATENT DOCUMENTS 4,145,165 A * 3/1979 Perkins et al. ................. 417/418
5,394,288 A 2/1995 Nishida et al.
(Continued)

FOREIGN PATENT DOCUMENTS

DE 4407276 9/1995
EP 728489 8/1996
(Continued)

OTHER PUBLICATIONS

Blackmer Compressors, CB-039, found at http://www.psgdover.com/assets/blackmer/cbpdf/cb039.pdf.*

(Continued)

*Primary Examiner* — Bryan Lettman
(74) *Attorney, Agent, or Firm* — Winstead PC

(57) ABSTRACT

Driving arrangement (11) for a pump, compressor or similar, adapted to provide alternating pressure in at least two chambers (27a, 27b, 27', 27"), such as chambers of a pump or compressor, as result of a reciprocating movement of a bar element (23). The bar element is connected to two movable pressure chamber faces being pistons (21a, 21 b) or plungers having fluid connection to said chambers, which bar element (23) is reciprocally supported in a housing (19). The driving arrangement further comprises an electric motor (31) which is adapted to provide the reciprocating movement of the bar element (23). The bar element extends through the rotor (31b) of the electric motor (31). The electric motor is an electric rotary motor. The invention also relates to a pump assembly with a plurality of such driving arrangements.

15 Claims, 13 Drawing Sheets

(51) Int. Cl.
*H02K 7/06* (2006.01)
*F04B 43/04* (2006.01)
*F04B 43/09* (2006.01)
*F04B 43/107* (2006.01)
*H02K 7/108* (2006.01)
*H02K 5/132* (2006.01)

(56) References Cited

U.S. PATENT DOCUMENTS

| | | | |
|---|---|---|---|
| 6,102,673 | A | 8/2000 | Mott et al. |
| 6,139,288 | A * | 10/2000 | Karasawa ................ 417/415 |
| 6,325,159 | B1 | 12/2001 | Peterman et al. |
| 6,499,974 | B2 * | 12/2002 | Bach ........................ 417/549 |
| 6,505,691 | B2 | 1/2003 | Judge et al. |
| 7,066,247 | B2 | 6/2006 | Butler et al. |
| 7,287,595 | B2 | 10/2007 | Johansen et al. |
| 2001/0027087 | A1 | 10/2001 | Shiomi et al. |
| 2006/0045782 | A1 * | 3/2006 | Kretzinger et al. ........... 417/559 |
| 2009/0053074 | A1 | 2/2009 | Babicki et al. |

FOREIGN PATENT DOCUMENTS

| | | |
|---|---|---|
| EP | 1114933 | 7/2001 |
| EP | 1435459 | 7/2004 |
| JP | 01-199123 | 8/1989 |
| JP | 10-271742 | 10/1998 |
| JP | 10-281056 | 10/1998 |
| JP | 2004124759 A | 4/2004 |
| JP | 2004144022 A | 5/2004 |
| WO | WO-96/18036 | 6/1996 |
| WO | WO-2005/096472 | 10/2005 |

OTHER PUBLICATIONS

Kolby, Lars, "International Search Report", for PCT/EP2009/066657 as mailed Feb. 18, 2010, 4 pages.

* cited by examiner

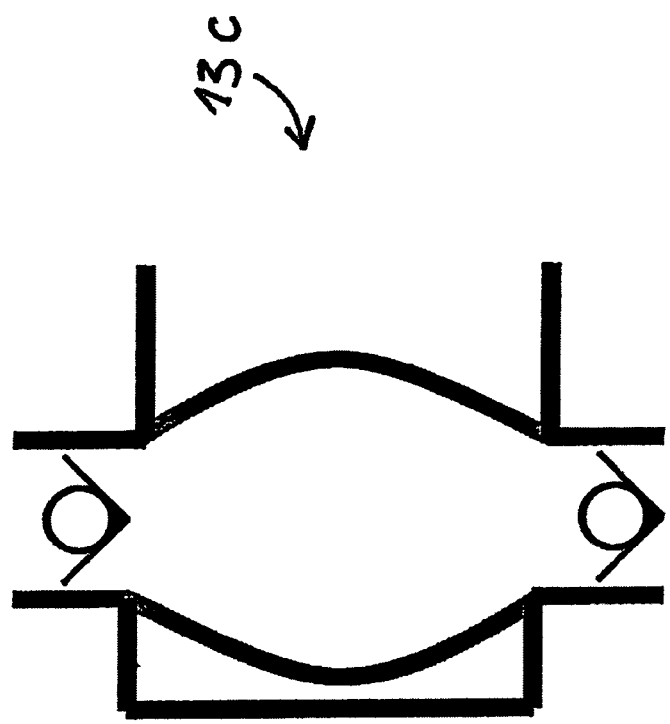
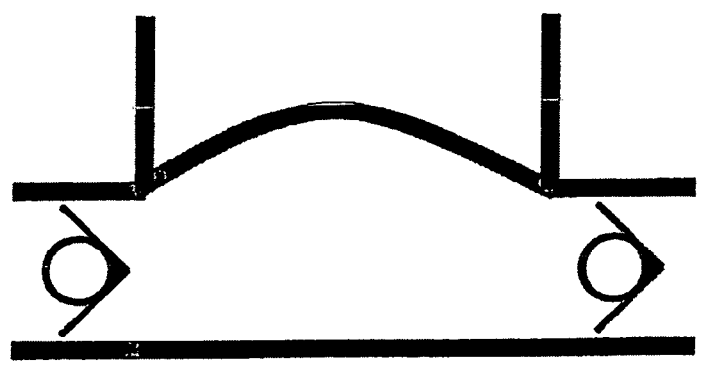
Fig. 3

DRIVING ARRANGEMENT FOR A PUMP OR COMPRESSOR

The present invention relates in general to a driving arrangement for pumps and compressors. The invention also relates to an assembly of such a driving arrangement with a plurality of pumps, for which the driving arrangement is particularly well suited.

BACKGROUND

Various types of driving arrangements are known for pumps and compressors. The type is typically chosen on basis of parameters as weight, volume, force, speed, sound level, vibration level, reliability, available power supply, and price, etc. For instance, for subsea applications one particularly wants a reliable driving arrangement which requires less maintenance and which can be driven with hydraulics or electrical power.

From patent publication U.S. Pat. No. 7,287,595 it is known to use an electric motor to drive a hydraulic piston for supplying hydraulic pressure in a subsea environment. The electric engine is connected to a roller screw assembly (170) through a planet gear (190). To the roller screw is connected a piston stem (134) which in its opposite end is fixed to a hydraulic piston (130). The assembly can thus provide a hydraulic pressure by means of electric power to the electric motor, which hydraulic pressure is accumulated in an accumulator (142). In this way one avoids that hydraulic umbilicals must be guided from the sea surface, down to a subsea well, for instance.

In the solution shown in U.S. Pat. No. 7,287,595, it is worth noting that the stroke length of the piston stem (134) is limited to the area between the planet gear (190) and the outer (lowermost) limit for movement in the roller screw assembly (170).

Patent publication U.S. Pat. No. 4,145,165 describes a long stroke pump which has a threaded rod which extends through the rotor of an electric motor. When running the rotor, the rod will move axially in a reciprocating path due to the threaded engagement with the rotor. The two ends of the rod function as two plungers which provide pumping action by repeatedly entering and leaving two adjacent chambers.

In addition, patent application publication US 2009/0053074, which was published on 26 Feb. 2009, describes a similar displacement pump which uses an electric linear motor for providing a similar reciprocating movement of a piston rod. This pump uses pistons at respective ends of a piston rod.

Furthermore it is known to provide the piston movement by attaching the piston stem, directly or indirectly, to a crankshaft (see FIG. 1) or a flywheel. Such a crankshaft or flywheel will have an axial direction crosswise to the stroke length of the piston. This makes the assembly space demanding. Furthermore the stroke length is limited by the dimensions of the crankshaft or flywheel in the radial direction.

It is a purpose of the present invention to provide a driving arrangement for pumps and compressors which avoids the disadvantages mentioned above, and which in addition exhibits additional advantages in respect to the prior art.

THE INVENTION

According to a first aspect of the invention there is provided a driving arrangement for a pump, compressor or similar, adapted to provide alternating pressure in a chamber, such as a chamber of a pump or compressor, as a result of a reciprocating movement of a rod element. The rod element is connected to a movable pressure chamber face, such as a piston or a membrane, and the rod element is supported in a house in a reciprocating manner. The driving arrangement further comprises an electric motor which is adapted to provide the reciprocating movement of the rod element. The driving arrangement is characterized in that the rod element runs through the rotor of the electrical motor.

The pressure chamber face can be of a plurality of types. Generally it is a face, the movement of which leads to a change of volume in the pressure chamber which it faces. It can, for instance, be a piston which can be mounted to the rod element. It can also be a membrane in a membrane pump which is mechanically connected to the rod element. Furthermore, it can be a movable part of a pressure chamber of a pump. The rod element can be connected to the pressure chamber mechanically or through a fluid connection. Thus, the rod element can itself be a piston, for instance, of which moving energy is hydraulically transferred to a pump or compressor.

The rod element is a part which runs through the rotor of the electric motor. The rotor can be a rotating part of a rotating electric motor, or a non-rotating part of a linear electric motor. The rod element is thus the part which connects the moving energy of the motor to the pressure chamber face. This can take place directly or indirectly.

The rotor of the electric motor can be arranged in a fluid chamber which is confined by at least said housing and at least one movable pressure chamber face. The housing of the driving arrangement exhibits a wall which contributes in confining the fluid chamber.

The number of movable pressure chamber faces which contributes in confining the fluid chamber can advantageously comprise two. These two pressure chamber faces are preferably connected to a rod element on each respective side of the electric rotor, so that a force balance is provided between the two pressure chambers when these see the feed pressure in said chamber.

The fluid chamber is preferably filled with liquid. This results in a plurality of advantages which will be described closer below. It may, however, also be filled with gas.

The movable pressure chamber faces can be pistons, which mutual distance is kept substantially constant by the rod element to which they are connected. In this way the volume in the fluid chamber is also held constant. This results in less fluctuating pressure in the fluid chamber during movement of the pistons. Moreover, it should be noted that advantageously there is no compression work performed on the fluid in the fluid chamber.

The driving arrangement can be connected to pumps or compressors, with which the said two respective movable pressure faces co-function. Advantageously, one pressure face functions with one of the two pumps or compressors. The two pumps or compressors can be connected to the same source for the media which shall be pumped or compressed. This advantageously results in that the pressure in the said media on the inlet side of the respective pump or compressor is substantially the same.

The electric motor can preferably be a rotary motor and the driving arrangement can comprise a roller screw assembly for conversion of the rotational movement of the electric motor to a linear movement of the rod element. Roller screw assembly is meant to comprise all types of suitable arrangements for conversion of the rotational movement of the rotational motor to a linear movement of the rod element. In addition to conversion of the movement from rotational to linear, a force transmission may also advantageously take place. The driving arrangement can also comprise a plurality of roller screw assemblies. The position of the rod element is preferably determined by the number of performed revolutions of the rotor of the electric motor. The axial position of the rod element can thus advantageously be monitored by reading the number of revolutions.

The driving arrangement can be adapted to generate electric energy by using the electric motor as a generator when slowing down its movement. In this way an energy efficient driving arrangement is achieved, where parts of the built up kinetic energy can be regained for outlet from the driving arrangement as electric energy. By transferring kinetic energy from a driver arrangement in a retardation phase through the motor and control system to one or more motors of other driver(s), which simultaneously is in the acceleration phase, allows for preservation of needed energy for the rotating and linear movement within the total pump arrangement minus losses.

In the embodiments where the fluid chamber is filled with a liquid, this can advantageously be the same liquid as on the opposite sides of the pressure chamber faces. A possible leak over the pressure chamber faces will then have less importance.

Furthermore, when the fluid chamber is filled with a liquid, this may preferably be set under a pressure which is higher than the pressure on the opposite sides of the pressure chamber faces. This ensures that a possible leak will take place in a direction out of the fluid chamber.

The driving arrangement may additionally comprise a closable fluid connection between a first and a second chamber. Such a connection or channel is appropriate for adjustment of the position of the rod element and the pressure chamber faces, as well as for regulation of the amount of fluid in the chambers.

According to a second aspect of the invention there is provided a pump assembly comprising two driving arrangements and pumps or compressors attached to these. The driving arrangements are adapted to provide alternating pressure in chambers of the said pumps or compressors as result of a reciprocating movement of a rod element, wherein the rod element is supported in a housing in a reciprocating manner, and wherein each driving arrangement furthermore comprises an electric motor which is adapted to provide the reciprocating movement of the rod element. The pump assembly is characterized in that the rod element runs through the rotor of the electric motor and on each side of the electric motor is connected to a movable pressure chamber face, such as a piston or a membrane, which movement results in pressure change in said chambers, wherein the pressure change results in pumping or compressing function.

The driving arrangements in such a pump assembly according to the second aspect of the present invention can be driven with a mutual phase difference. This renders an even pump flow possible, if the pump assembly is connected to the same source for what shall be pumped. Corresponding advantageous result can be achieved with regards to the load of an electric power supply.

The possibility for precise position controlling allows for running curves for the driving arrangement, which can be freely chosen within the drives running envelope, based on torque, inertia, speed, stroke distance, current and voltage available. The pump will continue to fulfill a constant flow as long as the different running curves for the speed of all rod assemblies are kept with a constant sum at all times. This requires that the combined change in speed fulfills $dv/dt=0$. The result of a constant combined instantaneous speed with a fixed active piston area is a constant flow of the pumped medium. This means also that the time span in which one of the drivers accelerates must correspond to the time span which another driver arrangement uses for retardation. This will keep the sum of the acceleration and power constant over time. The acceleration and retardation can also be zero, this also resulting in a constant combined speed.

According to a preferred embodiment, the driving arrangements in an assembly of two or more driver arrangements comprises an electric motor controller which is adapted to control the electric motor according to behavior of another driving arrangement in the assembly. Advantageously, the running curve of a first electrical motor, or driving arrangement, will thus be adapted to the running curve of a second electric motor or driving arrangement. This allows for adapting a pump flow based on the inherent consistency of the pumped media. The consistency of the pumped media can for instance be affected by the existence of impurities, such as particles, rocks, bubbles, larger gas amounts. Malfunction(s) can also, in addition to the said, be compensated within the allowed operating envelope of the drivers.

A driving arrangement and a pump assembly according to the first or second, respectively, aspect of the invention, will advantageously give a compact construction shape, low complexity, low weight, few parts, facilitate the use of a motor with high torque, as well as different thruster positioning.

Further advantageous features are described in the claims.

EXAMPLE

In order to give a better appreciation of the various technical features and functions of the present invention, an example description of an embodiment is given in the following. The description is given with reference to the drawings, wherein FIG. 1 shows a known displacement pump with crankcase and cross head;

FIG. 3 shows schematic principle sketches of a membrane pump and a hose membrane pump;

Figure 1:
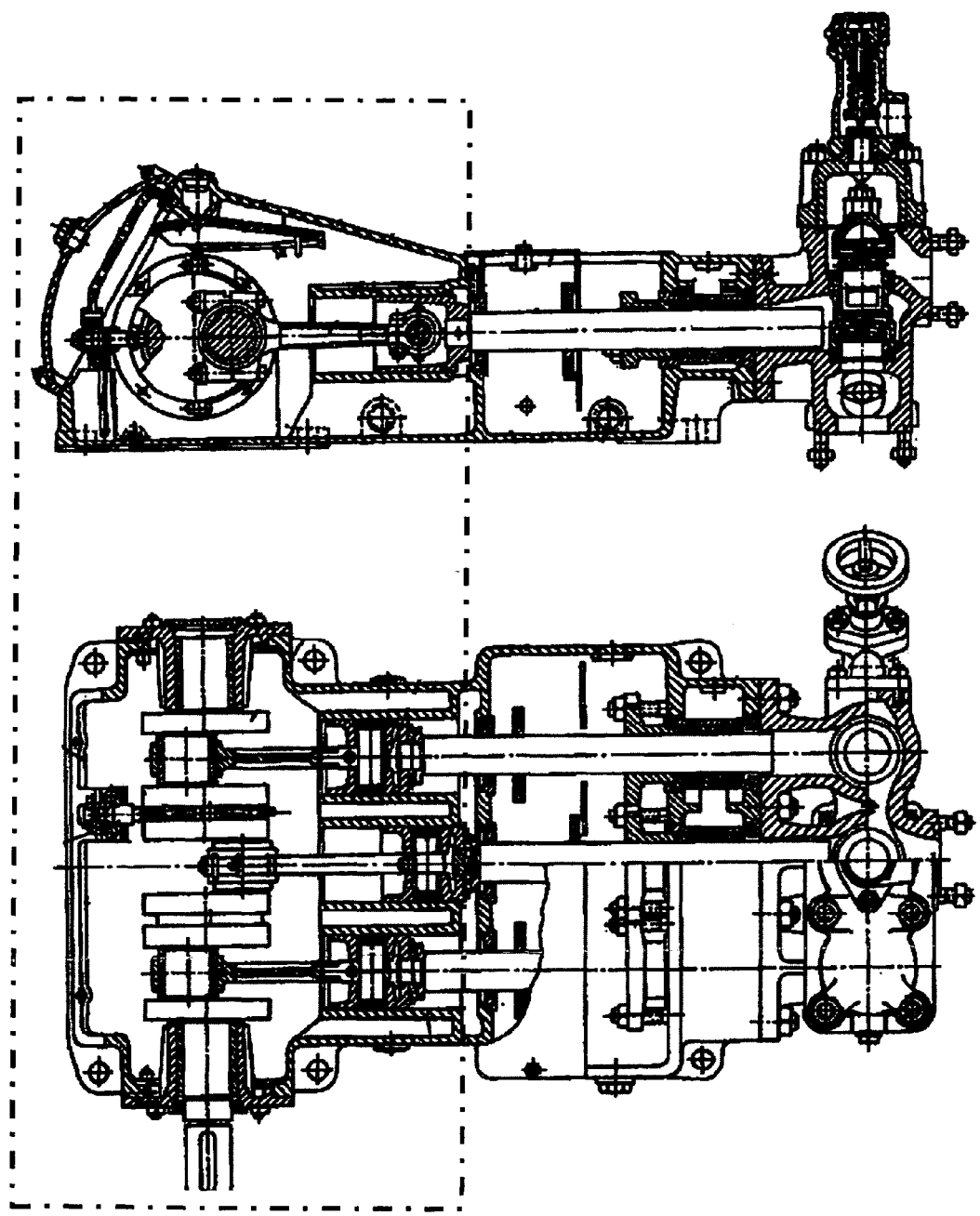

In FIG. 1 is shown a known displacement pump with crankshaft and cross head. As one can see from the figure, a relatively large space and heavy elements are required for the crankshaft and the cross head, despite the fact that the engine is not included. In the following example of embodiment is described a driving unit which replaces what is inside the dotted line of FIG. 1, and which in addition comprises the driving motor.

Figure 2:
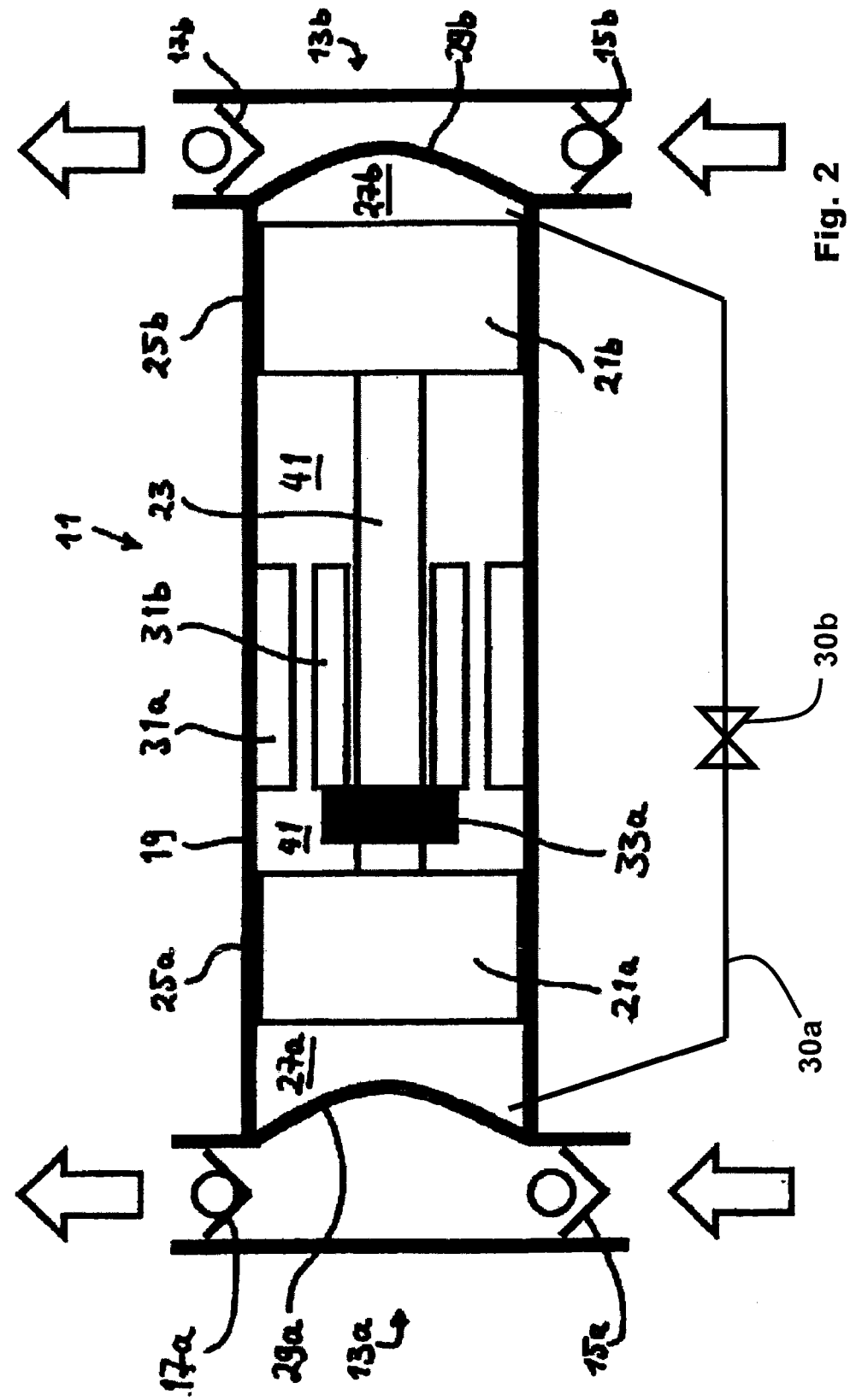
FIG. 2 shows a schematic principle drawing of an advantageous embodiment of one aspect of the present invention.

In FIG. 2 is shown a schematic principle sketch of a driving arrangement 11 for a first and second membrane pump 13a, 13b. The membrane pumps 13a, 13b each has its inlet valve 15a, 15b and each its outlet valve 17a, 17b, respectively.

The inlet and outlet valves open and close in dependence of the pressure difference over them. The valves could also be controlled in another way, for instance electrically or hydraulically controlled. The incorporated arrows show the flow directions for the membrane pumps 13a, 13b.

The invention is, however, not limited to membrane pumps or to pumps as such. The driving arrangement according to the invention can thus for instance be used for operation of a compressor or another device. In FIG. 3 are shown schematic principle sketches for a membrane pump 13a, as those shown in FIG. 2, as well as for a hose membrane pump 13c. Pumps and compressors are assumed to be known for a person skilled in the art and will not be further described herein. Instead, the driving arrangement 11 for such arrangements will be described in further detail.

It is again referred to FIG. 2. The driving arrangement 11 comprises a cylindrical housing 19. In the housing 19 there is arranged a first and a second piston 21a, 21b which is connected to each other with a piston rod 23. The pistons bear against the inner wall face of the housing 19 with seals 25a, 25b, in such a way that they form a barrier against each side of the respective piston 21a, 21b. The pistons could also be arranged in an additional cylinder or bushing on the inside of the housing 19. On the left hand side of the first piston 21a there is thus provided a first function chamber 27a between the first piston 21a and the membrane 29a of the first membrane pump 13a. Correspondingly there is provided a second function chamber 27b between the second piston 21b and the membrane 29b of the second membrane pump 13b.

In the mid part of the housing 19 there is arranged an electric motor 31. The electric motor 31 is arranged in a fluid chamber 41 between the first and second piston 21a, 21b. The stator 31a of the motor is connected to the inner wall of the housing 19. Radially inside of the stator 31a the rotor 31b of the motor is arranged. The power supply of the electric motor 31 is not shown. Radially inside the rotor 31b the piston rod 23 is arranged in such a way that the rotor 31b can rotate freely in relation to this. The electric motor 31 can preferably be a permanent magnet motor.

To the rotor 31b is attached a nut 33a, in such a way that the nut 33a rotates with the rotor 31b. The nut 33a is a part of a roller screw assembly 33 and is in engagement with slots in the piston rod 23 in such a way that rotation of the nut 33a leads to axial movement of the piston rod 23. The slots in the piston rod 23, which are in engagement with the nut 33a, are not shown. The first and the second piston 21a, 21b can thus be moved axially by rotation of the electric motor 31. Furthermore, the axial direction can be determined by the rotation direction of the rotor 31b.

It shall be noted that the invention is not limited to the type of arrangement which is used to convert the rotational movement of the electric motor 31 to axial movement of the piston rod 23. A person skilled in the art will thus be able to choose the most suited power transmission arrangement, for instance with regards to forces, speeds, weight, volume, energy loss, maintenance, reliability, and price.

Depending on the area of use for the driving unit one may also employ a gear ratio between the electric motor 31 and the nut 33a, such as with a planetary gear.

Figure 5:
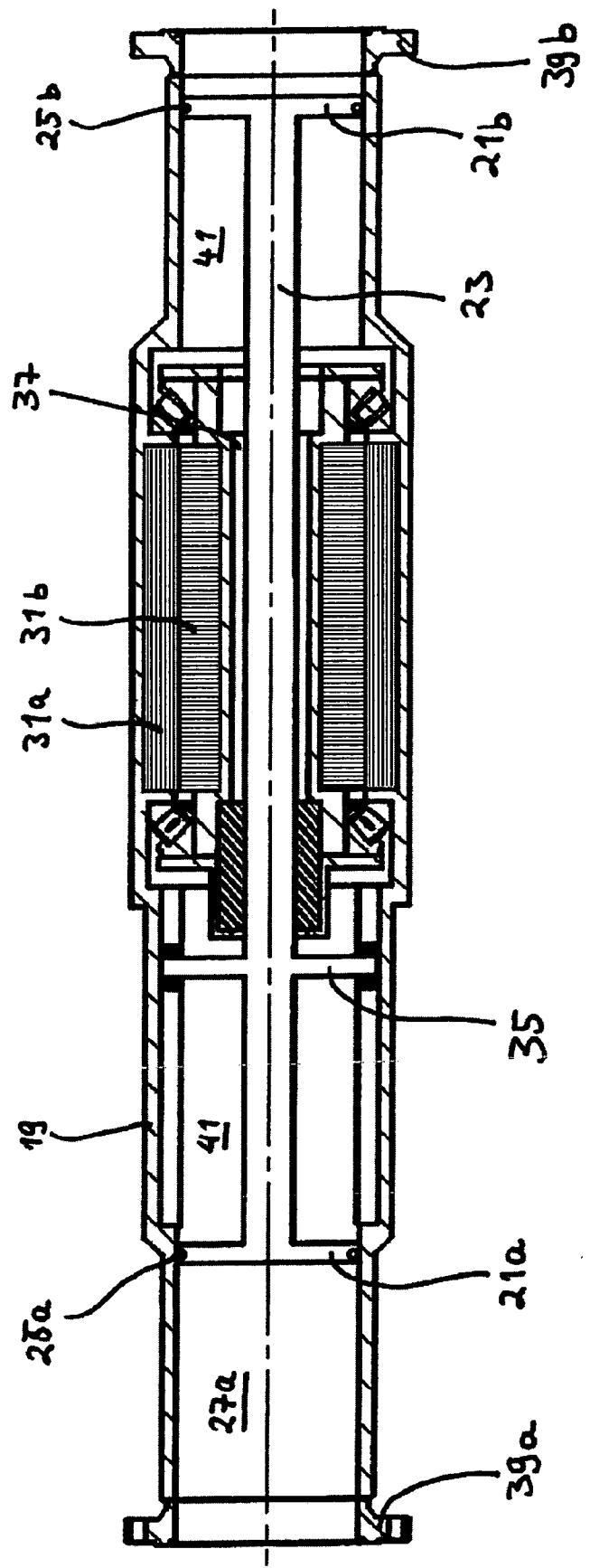
FIG. 5 shows a cross section view of a more realistic implementation of the driving unit in FIG. 2.

It is now referred to FIG. 5, which depicts a cross section of a more realistic example of the driving arrangement shown in FIG. 2. The fluid chamber 41 between the first and second piston 21a, 21b can advantageously be filled with a liquid. The liquid can be of a plurality of types, depending on the area of use for the driving arrangement. For many applications, however, oil will be advantageous. The moving parts, such as the electric motor 31 and the roller screw 33 (nut 33a) will then be lubricated in a good manner. Simultaneously, liquid will contribute in cooling the electric motor 31.

A particular advantage with using liquid in the housing 19 is that the driving arrangement then will be particularly well suited for use in high pressures, for instance at great sea depths. Furthermore, if the membrane pumps 13a, 13b (FIG. 2) are connected to the same source, the pressure in this source will act on both sides of the driving arrangement, that is on left and right, respectively, side of the first and the second piston 21a, 21b. Thus, the electric motor does not need to work against a constant counter pressure, as it would have to if it only operated one piston. Yet another advantage is that the pressure drop over the pistons 21a, 21b becomes less, so that less leakage arises over the seals 25a, 25b. This assembly becomes particularly advantageous if the driving media in the first and second function chamber 27a, 27b is the same liquid as in the fluid chamber 41 between the first and second piston 21a, 21b. A leakage over the seals 25a, 25b will then play a smaller role. Further, the liquid in the fluid chamber 41 can advantageously be set under pressure, so that the liquid has a higher pressure than the liquid outside the pistons 21a, 21b. A possible leakage will then take place in direction out of this fluid chamber 41, so that the liquid herein is not contaminated. This will result in a long durability and operation reliability for the arrangement. A liquid in the fluid chamber 41 will advantageously both cool and lubricate the electric motor 31 and other mechanical moving parts, such as the roller screw arrangement 33.

Since the fluid chamber 41 between the first and other piston 21a, 21b is filled with a fluid, be a liquid or a gas, the fluid must flow past the electric motor 31 and the roller screw 33 (nut 33a), when the pistons move axially. A slit 37 is therefore appropriately arranged between the piston rod 23 and the rotor 31b. The fluid will also be able to flow through a slit between the stator 31a and the rotor 31b.

Instead of liquid it may in some cases be advantageous to use gas in the fluid chamber 41. Less fluid friction will then arise as a result of the flows than with a liquid. This can be particularly advantageous with light equipment which shall move rapidly.

In an appropriate embodiment it is arranged a closable fluid connection 30b between the first and second function chamber 27a, 27b. One may then move the pistons 21a, 21b without pumping. In this manner one can adjust or correct the pistons 21a, 21b into a correct or desired position, or adjust the fluid amount in the function chambers 27a, 27b. Such a closable fluid connection 30b an also be used for heating of the internal media and at a start-up sequence. Furthermore, it is advantageous to arrange one or more valves for access to the fluid chamber 41. In this way one may circulate the liquid in this chamber in a circulation outside the housing 19. This gives opportunity for heating or cooling of the liquid, as well as cleansing and/or replacing the liquid, without having to disassemble the driving arrangement.

By arranging a temperature gauge (not shown) in connection with the liquid in the fluid chamber 41, one can advantageously arrange a motor control which regulates the performance of the motor in relation to the measured temperature.

One can in this way provide an assurance against too much heat, as well as secure a sufficiently high temperature in the liquid when applying speeds that require a certain minimum temperature in the liquid.

To prevent the piston rod from rotating with the nut 33a, an anti rotation arrangement in the form of a cross bar 35 is arranged. The cross bar 35 is fixed to the piston rod 23 and extends crosswise with respect to this. At its two ends, the cross bar 35 is in engagement with axially longitudinal extending guiding slots along the inner wall of the housing 19. In this manner the cross bar 35 prevents the piston rod 23 (or the pistons) from rotating in relation to the housing 19. One can also imagine other ways of preventing this rotation. For instance, the pistons and the housing can have a non-concentric cross section.

In each end of the house 19 in FIG. 5 there is arranged flanges 39a, 39b for attachment to a pump or compressor (not shown).

Instead of using a liquid as driving media, for the transfer of forces from the pistons 21a, 21b to the membranes 29a, 29b, as in the example referring to FIG. 2, the driving arrangement may also drive pumps or compressors by mechanical transmission of the forces. Instead of one (or two) piston(s), the driving arrangement may thus be connected directly to, for example, the membrane in a membrane pump. One can also use the arrangement shown in FIG. 2 without the membranes 29a, 29b. The pistons 21a, 21b will then be in direct contact with the media being pumped.

A particular advantage with a driving arrangement as shown under reference to FIG. 2 or FIG. 5 is that the entire driving arrangement can be hermetically closed. It is thus not a need for dynamic seals. By studying the arrangement shown in FIG. 2, one may thus note that the two membranes 29a, 29b and the housing 19 make a closed space. However, one may advantageously arrange a valve (not shown) in the house 19 for possible refilling or pressure test of the fluid in the housing 19.

Figure 4:
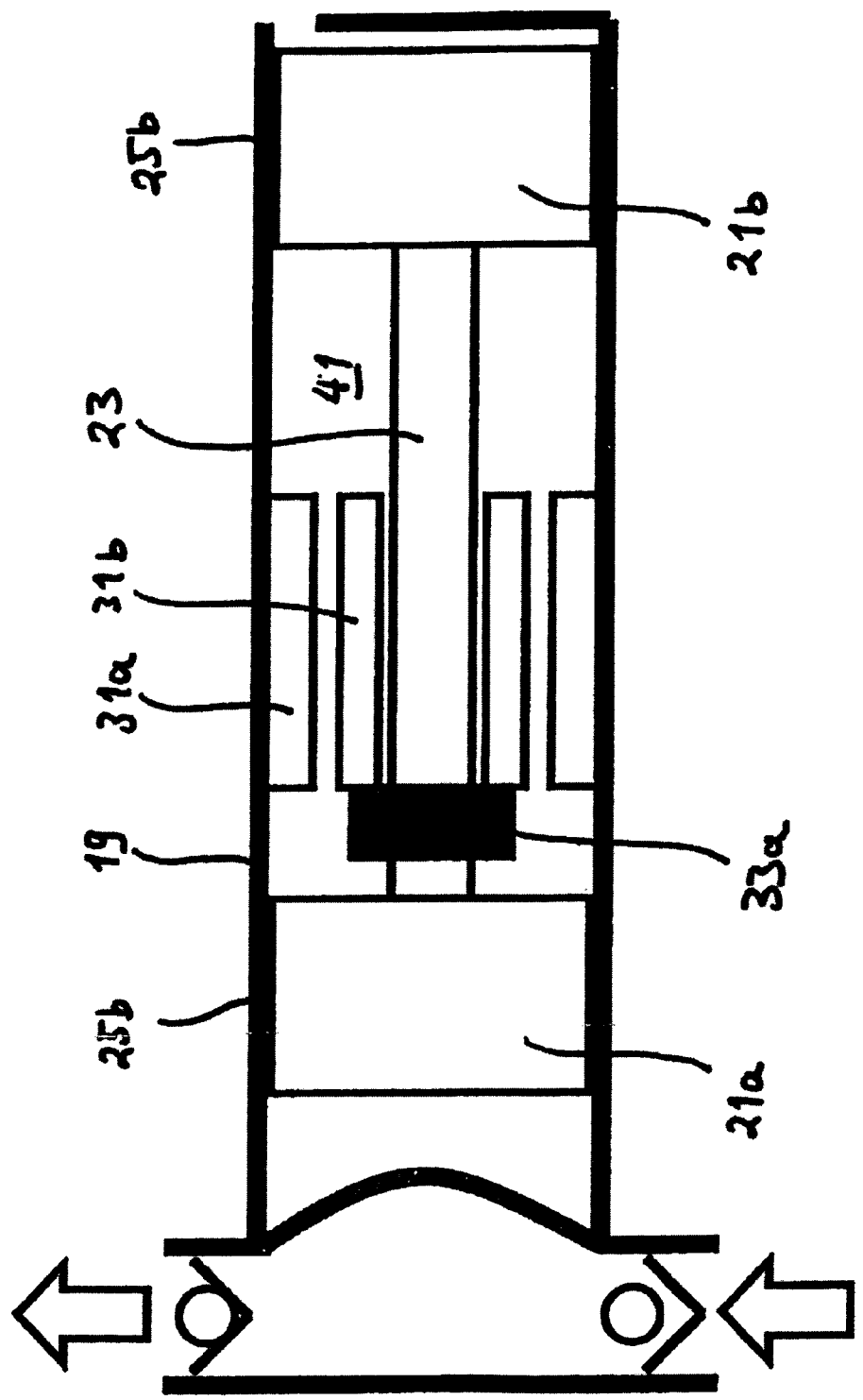
FIG. 4 shows an alternative embodiment of the driving unit in FIG. 2.

FIG. 4 shows an alternative embodiment of the assembly shown in FIG. 2. The assembly in FIG. 4 is only connected to one pump. On the right hand side of the assembly, the piston 21b is kept, but the chamber corresponding to the second function chamber 27b in FIG. 2 is vented, for instance towards atmospheric pressure or it may be filled with gas. By keeping the second piston 21b one obtain the possibility to pressurize the fluid chamber 41, and thus obtain the advantages mentioned above, despite the fact that the driving arrangement is only operating one pump.

Figure 6:
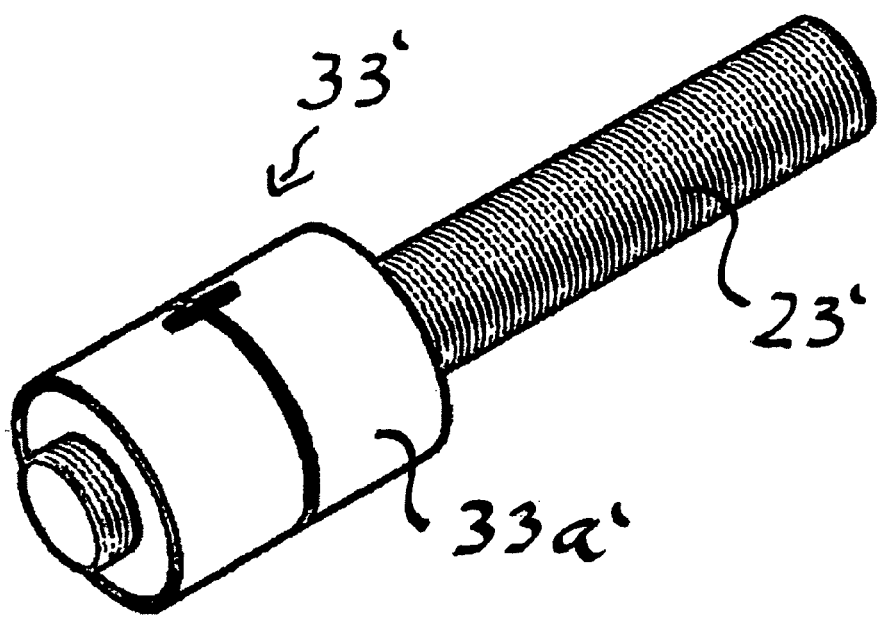
FIG. 6 shows a perspective view of a roller screw for conversion of rotational movement into linear movement.
Figure 7:
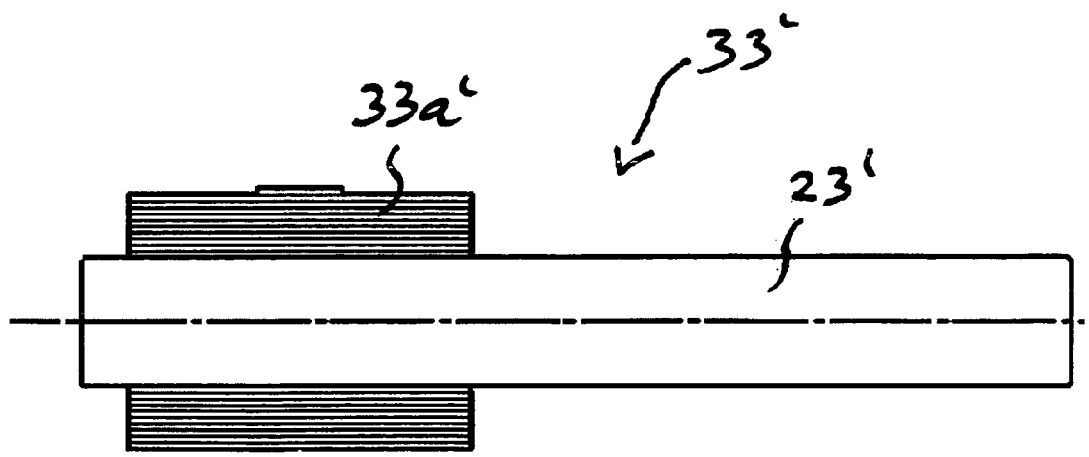
FIG. 7 shows a cross section view of the roller screw in FIG. 6.

FIG. 6 shows a perspective view of a roller screw assembly 33' which can be used in a driving arrangement as described with reference to FIG. 2. The roller screw assembly 33' has a nut 33a' on a piston rod 23'. The piston rod 23' has helical grooves which the nut 33a' is in engagement with. A rotation of the nut 33a' thus results in a movement of the nut along the length of the piston rod 23'. The piston rod 23 in the driving arrangement in FIG. 2 needs of course only to exhibit such grooves in the length of the desired stroke area. FIG. 7 shows the same roller screw assembly 33' as in FIG. 6 in cross section (grooves are not shown). As mentioned above, the driving arrangement according to the invention is not limited to the shown arrangements for conversion of rotational movement into linear movement.

Figure 8:
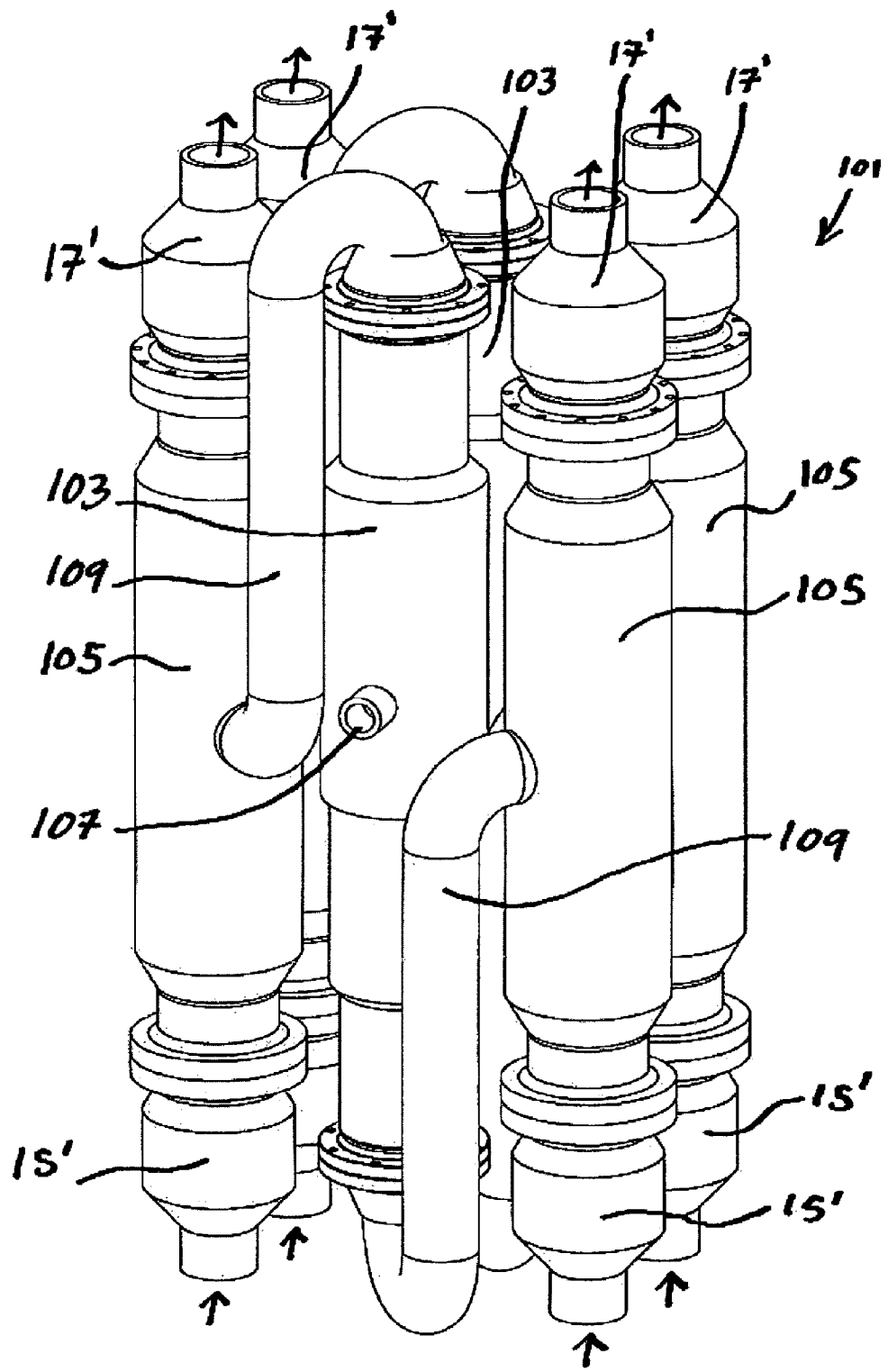
FIG. 8 shows a perspective view of a pump assembly according to the second aspect of the present invention.
Figure 9:
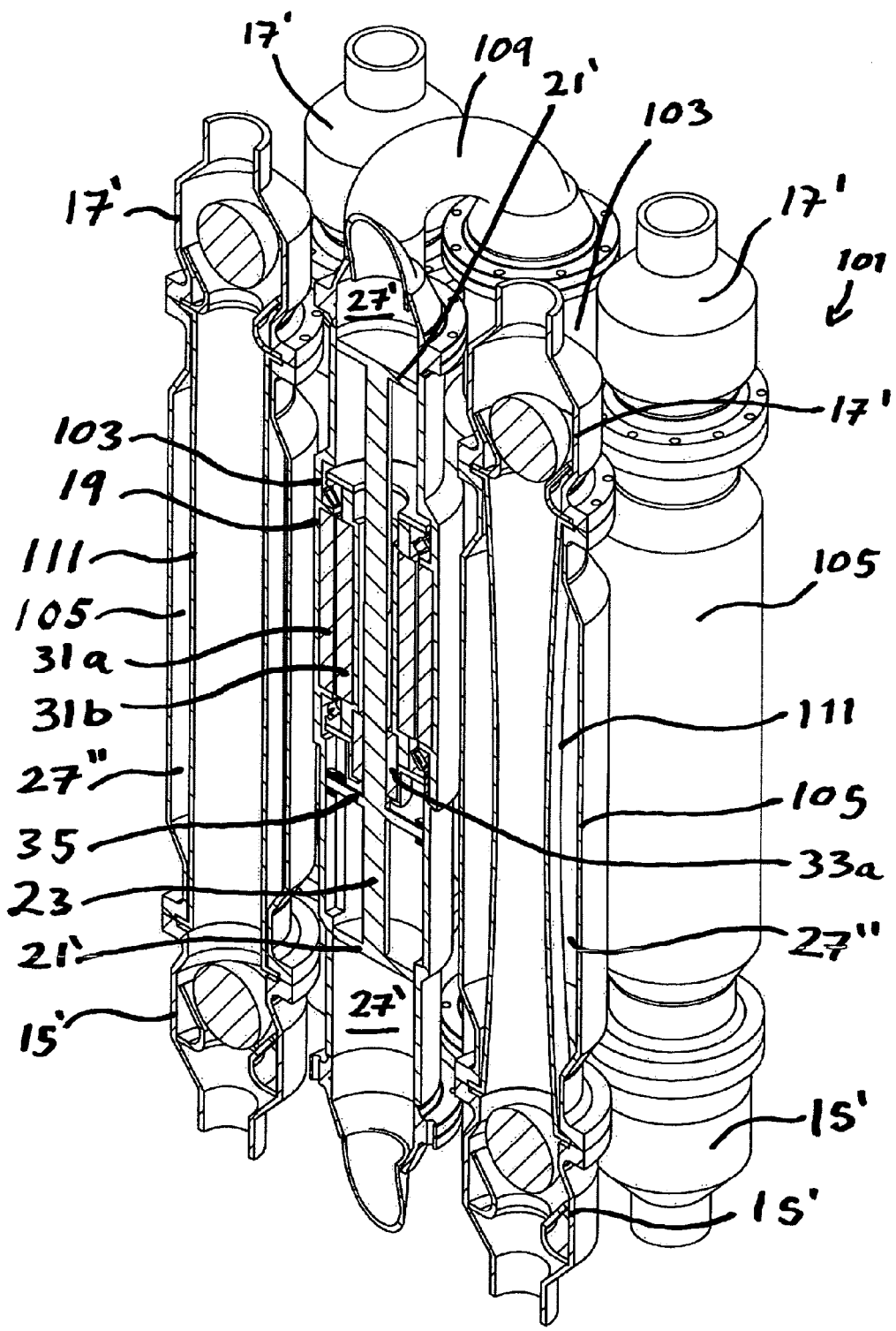
FIG. 9 shows a cross section view of the pump assembly in FIG. 8.

In FIG. 8 and FIG. 9 there is shown a particular example of embodiment for application of a driving arrangement, such as the one described above according to the first aspect of the invention. The figures show a pump assembly 101 comprising two driving arrangements 103 of the type shown in FIG. 2, as well as four hose membrane pumps 105. The inlets of the four hose membrane pumps 105 are advantageously connected to the same source and their outlets are also combined, so that the pump assembly 101 functions as one logic pump unit. As in the driving unit descried with reference to FIG. 2, the inlets of the hose membrane pumps 105 are at their respective inlet valves 15' and their outlets are at their respective outlets valves 17'.

As indicated, the driving arrangements 103 can preferably be of the kind described above in this description.

To each driving arrangement there is arranged an electric power supply socket 107, for operation of the respective electric motor 31.

In order to connect the function chambers 27' of the driving arrangements 103 to the hose membrane pumps 105 there are arranged fluid channels in the form of connection tubes 109 between the function chambers 27' and the hose membrane pumps 105. The connection tubes 109 constitute a part of a common chamber, comprising the function chambers 27' in the driving arrangements 103 and the chambers 27" (FIG. 9) on the outside of the membranes 111 of the pumps 105.

In FIG. 9 the hose membrane pumps are shown in more detail. The membranes 111 have a hose shape and extend between the inlet valve 15' and the outlet valve 17'. The valves 156', 17' are check valves.

The other components of the pump assembly 101 shown in FIG. 8 and FIG. 9 are described above under reference to FIG. 2 and FIG. 5.

By using two electric motors 31, i.e. one motor in each driving arrangement 103, they can advantageously be driven in such a way that they rotate in opposite directions. In this way the torsional moment of the entire pump assembly 101 can be neutralized.

Two hose membrane pumps 105 which are connected to the same driving arrangement 103 will with this configuration be driven in opposite phase. That means that when one pump 105 receives increasing pressure from the driving arrangement 103, the other pump 105 will receive decreasing pressure. Furthermore, with the pump assembly 101 shown in FIG. 8 and FIG. 9, the two driving arrangements 103 can be driven in such a way that one is run a quarter of a cycle or 90° behind the other.

One can also imagine arranging more than two driving arrangements 103 in a pump assembly. For instance, one can arrange three or more driving arrangements which are connected, for instance, to six or more pumps. In this way one can provide a quite steady pumping of the media which shall be pumped, something which will reduce wearing on mechanical parts. In an arrangement with six pumps, one can for instance pump with each pump in 60 degrees of a 360 degrees cycle. Or one may arrange the pumps in such a way that they overlap each other, for instance in such a way that each pump is adapted to pump during 70 degrees of a 360 degrees cycle. The first five and the last five degrees in the function length of each pump can then be common with the preceding and the next, respectively, pump in the cycle.

Figure 10:
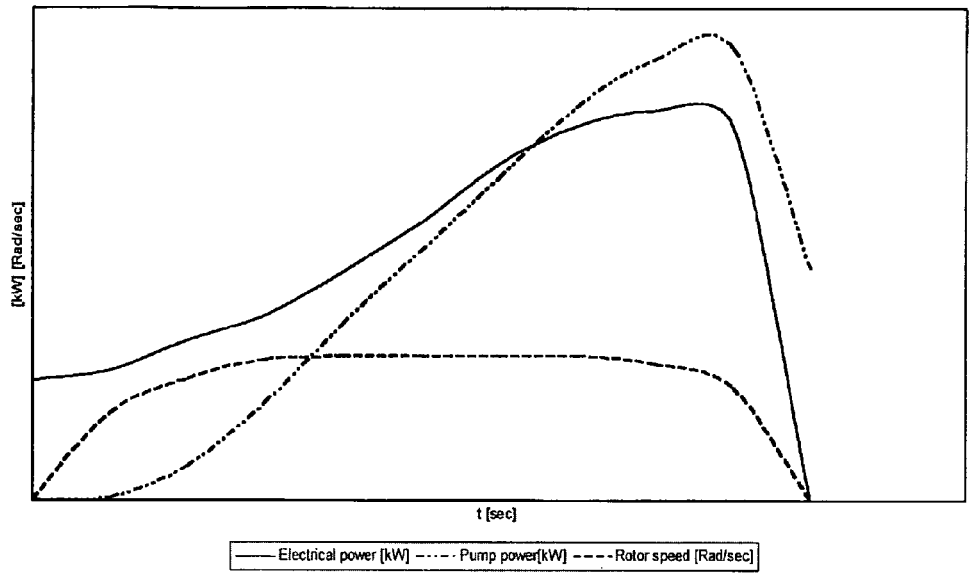
FIG. 10 shows graphs for electric power, pump power and rotor speed for a driving arrangement according to the invention.

A particular advantage with the use of electric motor in the driving arrangement is the possibility of dosing the stroke of the piston rod. FIG. 10 depicts an example of pumping in one total stroke length (stroke direction), wherein the entire rotational energy of the motor (and the nut and a possible gear device) is transferred to the pump media (the liquid between the pistons 21a, 21b and membranes 29a, 29b in FIG. 2). As one can see from the rotor speed graph for the rotor of the electric motor, the process can in broad outline be divided into an acceleration phase where the rotor speed increases, a steady phase where the rotor speed is relatively even, and a final retardation phase wherein the rotor speed decreases down to zero rotation. Furthermore, it will be typical that the closer to the end of the cycle, the more electric energy is used to push the pistons towards the end position.

Figure 11:
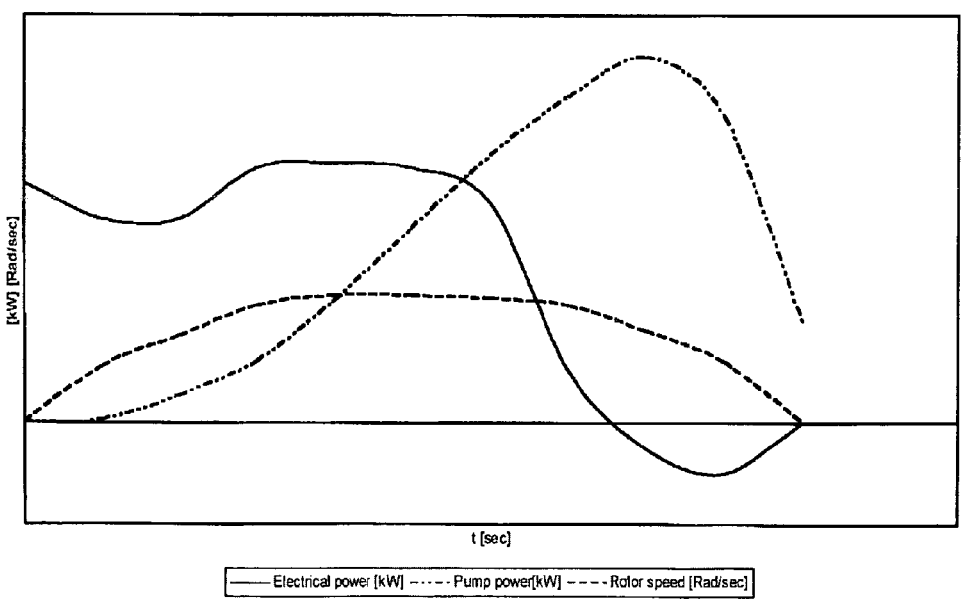
FIG. 11 shows advantageous alternatives of the curves in FIG. 10.

FIG. 11 shows an example of pumping in an entire stroke length, where a part of the rotation energy is transferred to the pump media, wherein the remaining rotation energy is lead back by using the motor to decelerate the rotation. The electric motor thus functions as a generator in the last part of the stroke length. The generated electrical energy can for instance be intermediately stored in a capacitor battery or transferred directly to another electric motor, for instance in another driving arrangement.

An electric control of the electric motor thus gives advantageously many possibilities for an advantageous control of the motor. One can adjust the speed of the motor, its acceleration and torque, on basis of parameters as for instance which media to be pumped and its condition (temperature, viscosity, specific gravity, etc.) and the condition of the driving arrangement (temperature, fluid type in the fluid chamber, age, etc.). Further, one may advantageously take eigenfrequency into consideration when determining the desired speed.

With the arrangement according to the invention, an electric rotating permanent magnet motor can advantageously be used. Further, the electric motor can be an asynchronous motor or a synchronous motor. Electric motors of types which exhibit high power efficiency and a high torque will be advantageous. Furthermore, both DC and AC motors can be used.

Instead of altering the rotation direction of the electric motor for a succeeding opposite stroke direction, one may also imagine a roller screw arrangement or corresponding device for conversion of rotational movement into linear movement, which is adapted in such way that the stroke direction changes automatically with unaltered rotation direction of the electric motor.

In an alternative embodiment, the stator of the electric motor can be arranged outside the housing 19. The stator will then be replaceable or removable for maintenance without having to open the fluid filled chamber in the driving arrangement. The stator could also be integrated into the housing 19.

Figure 12:
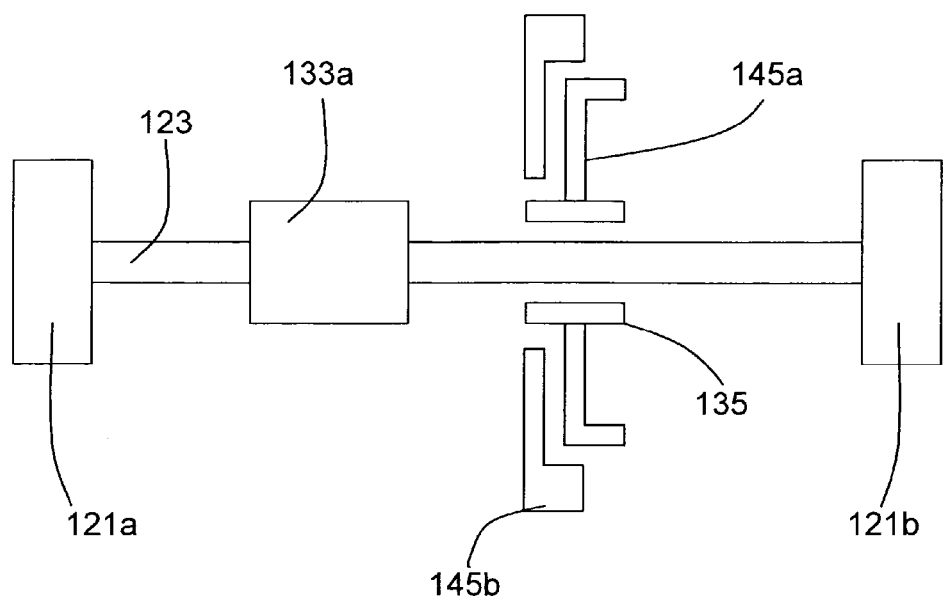
FIG. 12 shows a protective arrangement for protecting the driving arrangement against damages due to excessive forces.

FIG. 12 depicts an advantageous embodiment in which the driving arrangement is provided with a clutch 145a, 145b or release mechanism. For simplicity, FIG. 12 only shows some basic parts of the driving arrangement according to the invention. Corresponding to the driving arrangement described above, the piston rod 123 is provided with a nut 133a for transformation of the rotational movement of the electric motor into linear movement of the piston rod 123. At each end of the piston rod 123 are arranged pistons 121a, 121b. In order to prevent the piston rod 123 from rotating with the nut 133a, a linear guide 135 is in engagement with the piston rod 123. The linear guide can for instance be of one of the following types: ball spline, spline, polygonal shaft or similar. The linear guide 135 lets the piston rod 123 move linearly, while keeping it in a constant rotational position. Thus, during normal operation, there is a rotational force between the linear guide 135 and the piston rod 123.

In case of an unforeseen or excessive load on the piston rod 123, it is desirable to let the piston rod 123 rotate with the nut 133a in order to stop its linear movement and relieve it from excessive torques. To render this possible, a clutch arrangement comprising an inner clutch part 145a and an outer clutch part 145b is provided. The outer clutch part 145 is rotationally fixed to the housing (not shown). When an excessive torque force is exerted onto the inner clutch part 145a and the linear guide 135 from the piston rod 123, the rotational connection between the inner and outer clutch parts 145a, 145b will start to slip. As this happens, the piston rod 123 will start rotating with the nut 133a, and its linear movement will halt.

The clutch arrangement 145a, 145 can be of a variety of types. The functional features can for instance be based on magnets, spring forces, roll resistance, or friction. One can also imagine a shear pin solution, but this would require more labour after an actuation of the clutch or release function.

Advantageously, the torque threshold of the clutch arrangement can be adjusted, for instance by adjusting a force which pushes the inner and lower clutch parts 145a, 145b against each other. With such a feature, a mechanical safety mechanism is provided, which prevents excessive forces from the pistons 121a, 121b on the fluid on which they operate.

An advantage of the clutch arrangement is that it does not inflict any damage to the driving arrangement when actuated. Furthermore, the driving arrangement will be ready for use immediately after an actuation.

An additional advantageous feature will be to adapt the driving arrangement with feedback on the electric motor in order to monitor where the motor, or the piston rod, respectively, is positioned at any given time. This can for instance be performed by using a rotational position resolver which follows the motor or a linear positioning device following the linear rod movement or by measuring impedance from the motor seen by the motor controller, and possibly used with end position sensors.

In an alternative driving arrangement, as the one described herein, one can imagine that the electric motor is replaced by a hydraulic motor.

Figure 13:
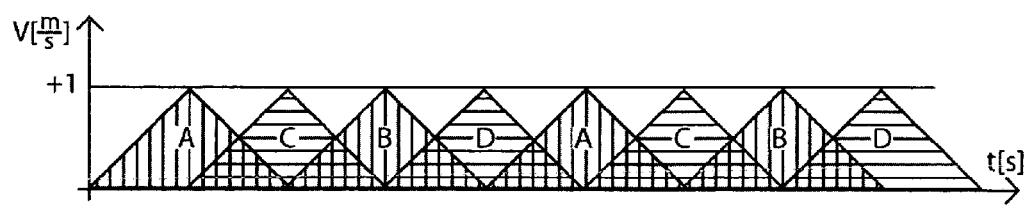
FIGS. 13 to 19 show various curves which describes the reciprocating movements performed by the driving arrangements in a pump assembly.

FIG. 13 depicts speed curves of two driving arrangements in a pump assembly. It can preferably be a pump assembly as the pump assembly (101) described with reference to FIG. 8 and FIG. 9. The two driving arrangements can be the driving arrangements 103 according to the above description.

The curves in FIG. 13 illustrates the absolute speed of four pistons, A, B, C, and D, where a first driving arrangement 103 comprise the two pistons A and B, and a second driving arrangement 103 comprise the two pistons C and D. Regarding the left hand side of FIG. 13, one sees that piston A accelerates from zero speed up to a normalized speed of 1, with a constant acceleration. At the end of one stroke of the piston rod 23, the speed is zero. In a middle position, between the two end positions of the reciprocating stroke path, the speed is at its maximum. One cycle of one driving arrangement 103 is performed when, according to the curves in FIG. 13, both the A and B pistons have performed one pumping action on the connected pump 105 (see FIG. 8 and FIG. 9).

The curve of the C and D pistons of the second driving arrangement 103 is lagging 90° or a quarter of a cycle after the curve of the first driving arrangement 103. As illustrated in FIG. 13, the sum of the two curves, of the first and second driving arrangements 103, are constant. That is, their added absolute speed is always "1" (normalized). This feature results in a constant pumping speed of the pump assembly 101, without ripples.

Figure 14:
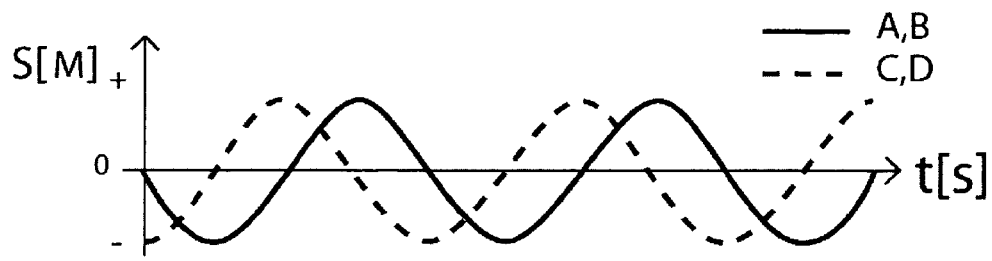
Figure 15:
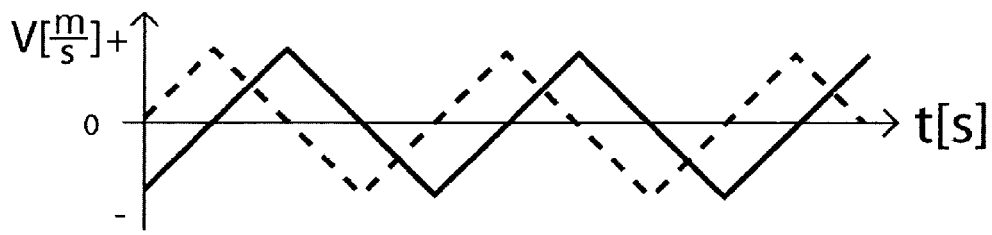
Figure 16:
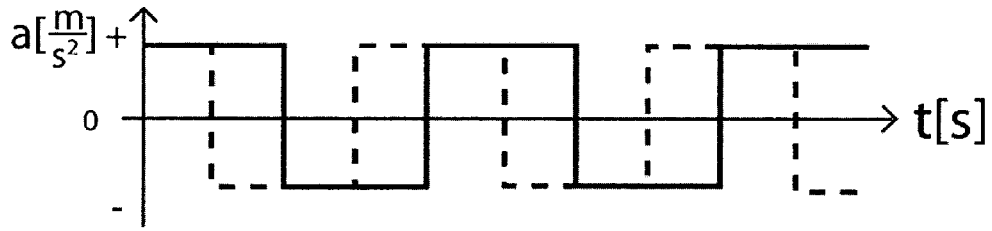

The relation between position, speed, and acceleration of the piston rod 23, along with its attached pistons 21a, 21b (or A, B, C, and D), is depicted in FIG. 14, FIG. 15, and FIG. 16.

Starting with FIG. 16, which illustrates the acceleration of the pistons or piston rod, one can see that the acceleration alternates between a positive constant value and the corresponding negative constant value. That is, from the intermediate position, in the middle between the two end positions of the reciprocating stroke path of the piston rod, it starts to decelerate. This deceleration results in zero speed at the end position. The relative deceleration continues, however, but since it continues from zero speed, it is in fact an absolute acceleration. Thus, from the end position, the speed increases until the piston rod reaches an intermediate position. At this point, the acceleration changes sign, and the piston rod is again decelerating until it reaches the other end position. The end position might differ from the actual full stroke end position.

FIG. 15 depicts the resulting speeds for the two piston rods of the first and second driving arrangement 103 of the pump assembly 101 (see FIG. 8 and FIG. 9). As is evident from FIG. 15, the resulting speed curves are "hat functions" or triangular functions. Such functions results from integration of the curves for acceleration in FIG. 16.

Integration of the speed curves of FIG. 15 results in the quadratic or second-degree curves of FIG. 14. The upper and lower peak points of these curves represents the end positions of the two piston rods of the two driving arrangements.

Advantageously, according to this embodiment, there will be no sudden movements of the piston rods 23. However, the movement of the pistons can in fact be as unsmooth as needed, within the operational envelope, to ensure the constant combined flow from the pump arrangement. A further advantage of this feature is the reduced wearing on the connected equipment, such as pipes and valves.

Figure 17:
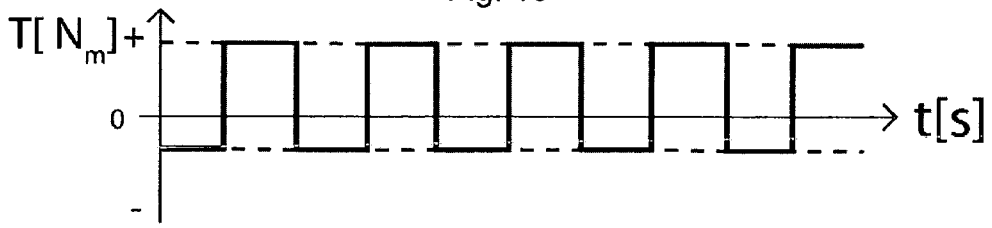
Figure 18:
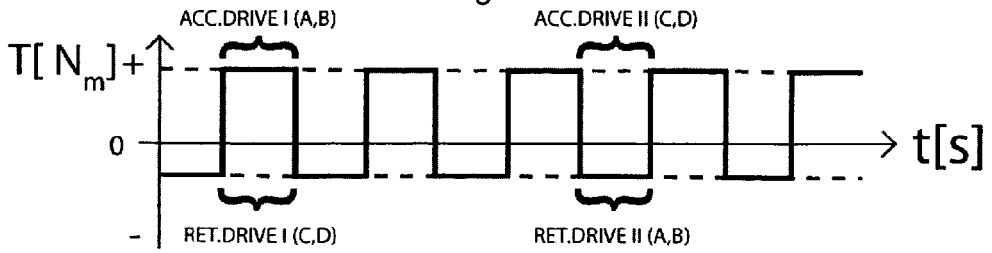

FIG. 17 shows the torques on the two respective piston rods 23 of each driving arrangement 103 of the pump assembly 101. The induced acceleration seen from the respective electrical motors 31 of the two driving arrangements 103 is like the torque curves with a periodic time equal to half of the other curves. The force acting on the piston rod from the motor, through the roller screw assembly 33, will be constant between two crossings of an intermediate position. However, since the direction of the electric motor changes at the end position, the torque curves have the half period with respect to the other shown curves. This means that the delivered power to the pump assembly 101 with the two driving arrangements 103 will be kept constant, as seen from the power grid. FIG. 18 shows the same curves as FIG. 17, however with some indications regarding acceleration and retardation of the two drivers, indicated as driver I and driver II.

Figure 19:
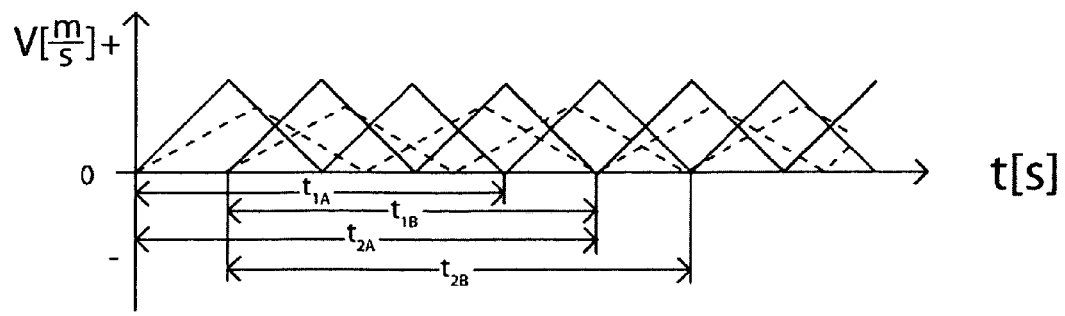

FIG. 19 depicts how the speed curves of the piston rod changes with regard to pumping speed. In order to maintain a constant sum of the two speeds of the first and second driving arrangement 103, when a first arrangement reduces its speed the second driving arrangement must reduce its speed correspondingly, so that their cycles have the same length. In FIG. 19 this is shown with two different speeds $V_A$ and $V_B$. As indicated in the figure, the cycle of the first driving arrangement, here indicated with the two different cycle lengths $t_{1A}$ and $t_{2A}$ must correspond to the cycle lengths of the second driving arrangement, namely $t_{1B}$ and $t_{2B}$. The said is also valid when fulfilled over partial periodes.

One can also imagine other curve shapes which will maintain the constant summarized speed. Such shapes can be calculated by performing a mathematical approximation for the motor control, based on solving resulting differential equations. This can be performed in a real time situation by an approximated solution based on the Galerkin's method.

In addition, one can imagine using even more than two driving arrangements 103 in one pump assembly, for instance three, four or even more, as long as the added sums of the instantaneous speeds are kept constant of time. The said also includes no periodic combinations of speed curves.

A driving arrangement with a combination of the roller screw arrangement and a permanent magnet motor allows for a very precise control of the torque and speed of the piston rod 23 and the connected pistons 21a, 21b. With the described combination, it is possible to transfer energy from a driving arrangement in a state of retardation to a driving arrangement which is in a state of acceleration.

Figure 20:
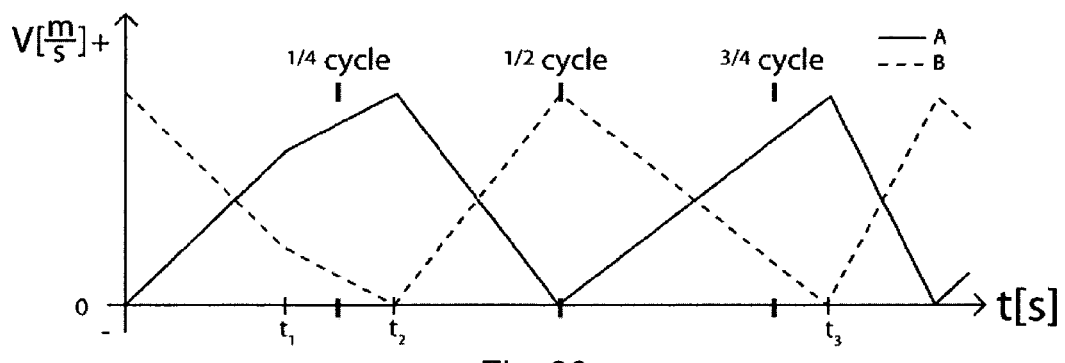
FIG. 20 shows an advantageous embodiment, regarding motor control.

Furthermore, in an advantageous embodiment of the pump assembly according to the second aspect of the invention, the driving arrangements 103 are adapted to be controlled on the basis of the behaviour of another driving element 103. This is illustrated in FIG. 20, showing the speed curves of two driving arrangements 103 in a pump assembly 101 (see FIG. 8 and FIG. 9). Each driving arrangement 103 is connected to two pumps 105 or pump heads. Sensor means and/or the motor controller (not shown) for the electric motors 31 can provide input regarding the behaviour of the driving arrangements 103. In the situation shown in this figure, a first driving arrangement A (continuous line) changes its acceleration value within a stroke at the time $t_1$. The reason for such a change can be a change in the pumped medium or other external or internal reasons. The second driving arrangement B (dashed line) adapts to this change in order to maintain a constant summarized speed (cf. the continuous horizontal curve). It thus changes its retardation at the time $t_1$, in accordance with the reduced acceleration for the first driving arrangement A.

It shall be noted that the curves can be more or less arbitrary within the operational envelope of the driving arrangements, while still maintaining the constant sum of their speeds.

One will notice from FIG. 20 that the curve for the first driving arrangement A is not striking its intended upper point at ¼ cycle. However, it is adapted in such way that it nevertheless strikes the planned lower point at ½ cycle. Similar observations can be made with respect to the curve of the second driving arrangement B.

After the point in time, at ½ cycle, the acceleration of the second driving arrangement B decreases, and the first driving arrangement A decreases its acceleration correspondingly. Its summarized speed is however the same as before. It should be noted that the area below the speed curve within a single directional stroke represents the stroke length for that stroke.

The limiting factors are the acceleration/retardation, here represented by the rate of increase or decrease of the linear curves.

Figure 21:
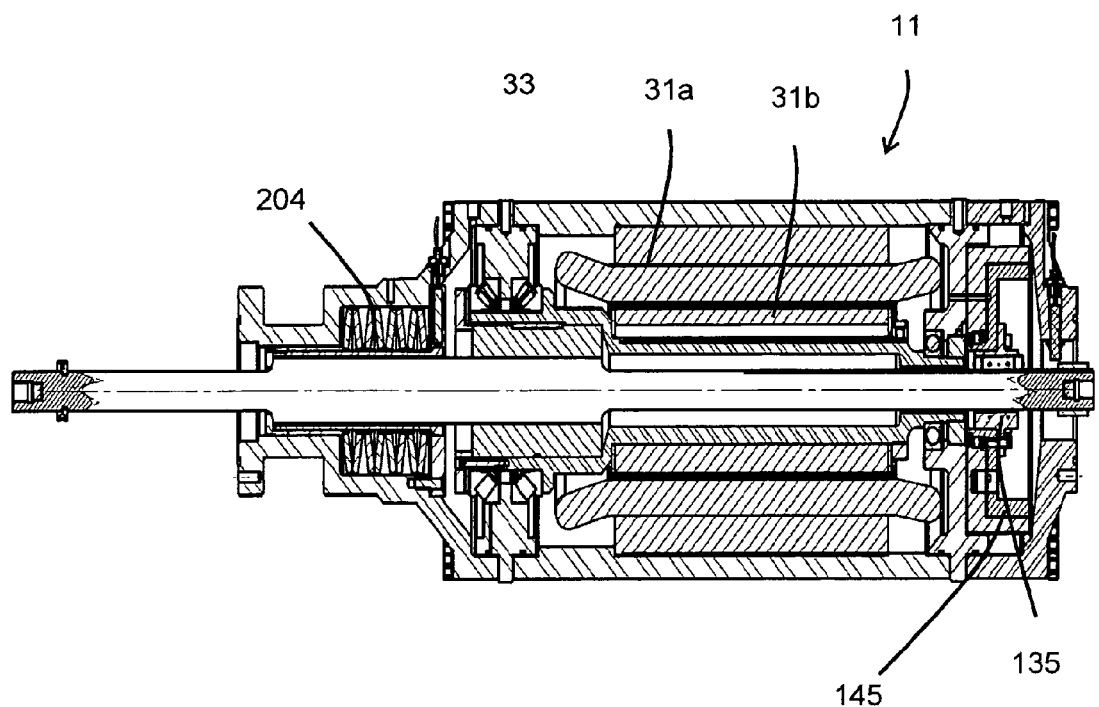
FIG. 21 shows another embodiment of the driving arrangement according to the first aspect of the invention.

FIG. 21 depicts a further embodiment of the driving arrangement 11 according to the first aspect of the present invention. Here, one can see the clutch arrangement 145 and the linear guide 135 as closer described with reference to FIG. 12. In addition, a spring means 204 is arranged in order to dampen possible uncontrolled excessive linear movements of the piston rod 23.

Figure 22:
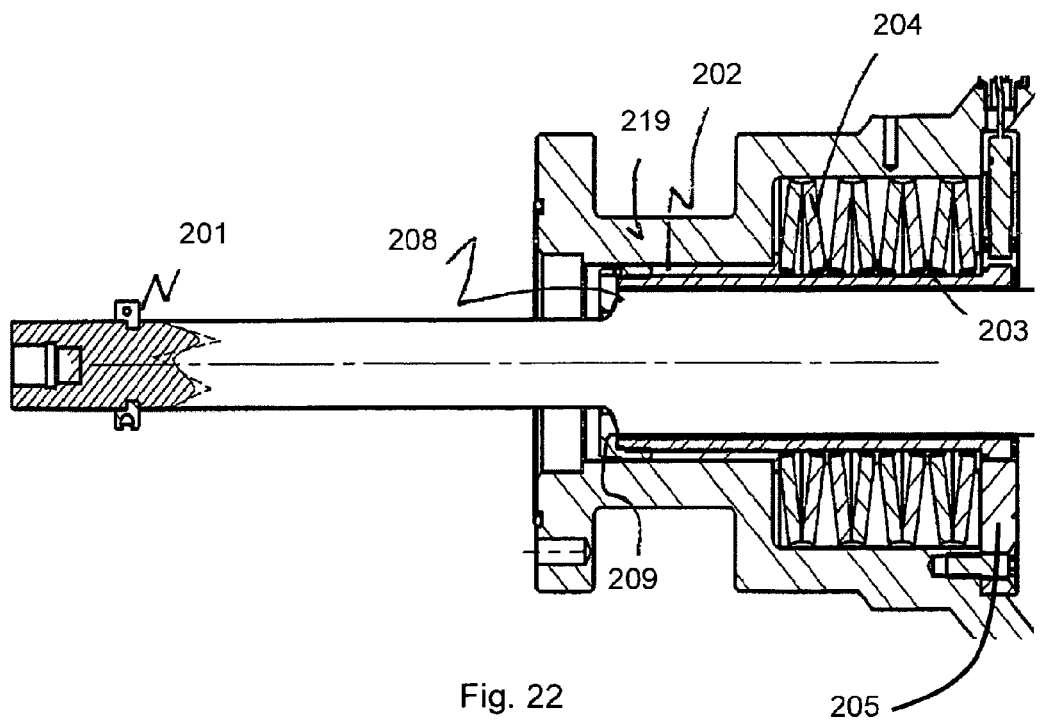
FIG. 22 shows a detail cross section view, illustrating a preferred embodiment of the driving arrangement.

In FIG. 22, the function of the spring means 204 is described in closer detail. The spring means 204 is arranged in such way that it may glide with respect to a first sleeve 203. In addition, a second sleeve 202 can glide with respect to the housing 219. If the piston rod 223 moves all the way towards the right in FIG. 22, a ring 201 is forced against the first sleeve 203, which guides the force via the second sleeve 202 onto the spring means 204.

If the piston rod 223 moves all the way towards the left in FIG. 22, an edge 8 on the piston rod 223 is forced against the sleeve edge 209 of the first sleeve 203, making the first sleeve 203 guide the tensile force which makes the compression of the spring means 204 from the right hand side. The spring means 204 is compressed against the housing 219. Advantageously, the spring characteristics of the spring means 204 can be adapted to the desired braking course.

By using one spring means 204 in order to dampen an uncontrolled or excessive movement of the piston rod 23 in both directions, a compact design is achieved. The spring means 204 can be of a plurality of types, for instance Belleville springs.

The driving arrangement according to the first aspect of the present invention, or the driving arrangements used in the pump assembly according to the second aspect of the present invention can advantageously produce a pressure rise of up to 90 bar at a capacity of 3000 l/min. More preferably, it can even produce a pressure rise of up to 120 bar at a capacity of 4000 l/min.

It is noted that further embodiments are possible. The scope of the invention is limited by the claims, and a person skilled in the art will be able to perform a plurality of alterations of the above-mentioned examples without leaving the scope of the invention.

The invention claimed is:

1. A driving arrangement for a pump or compressor or similar, that provides alternating pressure in at least two chambers of the pump or the compressor or similar, as a result of a reciprocating movement of a bar element, the bar element at its respective ends is connected to a movable pressure chamber face, the movable pressure chamber face is a piston or plunger, the bar element is reciprocally supported in a housing and wherein the driving arrangement further comprises an electric motor that provides the reciprocating movement of the bar element;
    wherein the electric motor is an electric permanent magnet rotary motor;
    wherein the bar element extends through the rotor of the electric motor and a rotational to linear transformation means is functionally connected between the bar element and the rotor of the motor in such way that rotation of the rotor results in linear movement of the bar element;
    wherein a linear guide is functionally connected between the bar element and the housing in such way as to prevent rotation of the bar element with respect to the housing;
    wherein the driving arrangement further comprises a release mechanism having a first clutch part connected to the linear guide and a second clutch part connected to the housing; and
    wherein at excessive rotational force between the first and second clutch parts the rotational connection between the first and second clutch parts will slip letting the bar element rotate along with the rotor of the motor and halting its linear movement.

2. The driving arrangement according to claim 1, wherein the driving arrangement may be ready for use immediately after an actuation of the release mechanism.

3. The driving arrangement according to claim 1, wherein functional features of the release mechanism are based on magnets or friction.

4. The driving arrangement according to claim 1, wherein the driving arrangement comprises spring means that dampen excessive longitudinal movements of the bar element.

5. The driving arrangement according to claim 4, wherein the spring means is arranged on one axial side of the electric motor and dampens excessive longitudinal movements of the bar element, as the spring means is compressed in a first direction by a first sleeve at excessive movement of the bar element in a first direction, and in a second direction by a second sleeve at excessive movement of the bar element in a second direction.

6. A pump assembly comprising:
    two driving arrangements, wherein each driving arrangement is separately connected to two pumps or compressors;
    wherein the two driving arrangements are controlled on a basis of an actual behavior of another of the driving arrangements to maintain a constant sum of respective instantaneous speeds of the two driving arrangements;
    wherein each of the two driving arrangements provides alternating pressure in chambers of said separately connected two pumps or compressors as result of a reciprocating movement of a respective bar element in each driving arrangement;
    wherein the bar elements are reciprocally supported in a housing of the two driving arrangements and wherein each driving arrangement further comprises an electric motor that provides the reciprocating movement of the bar element;
    wherein the electric motor is an electric permanent magnet rotary motor;
    wherein the bar elements extend through the rotor of the respective electric motor and a rotational to linear transformation means is functionally connected between the bar element and the rotor of the motor in such way that rotation of the rotor results in linear movement of the bar element;
    wherein the bar elements are each connected to a pair of pistons or plungers, which pistons or plungers provide said alternating pressure; and
    wherein the two pumps or compressors are of a type adapted for pumping or compressing a fluid when driven by said alternating pressure.

7. The pump assembly according to claim 6, wherein the bar elements of the two driving arrangements are run with a phase difference of 90 degrees in a constant reciprocating movement.

8. The pump assembly according to claim 7, wherein acceleration of the bar elements and the electric motor, respectively, when moving between two end points of a reciprocating moving path of respective bar elements, always has an absolute value larger than zero.

9. The pump assembly according to claim 8, wherein the acceleration of the bar elements and the electric motor, respectively, when moving between the two end points of the reciprocating moving path of the respective bar elements exhibit a constant absolute acceleration value.

10. A driving arrangement for a pump or compressor or similar, that provides alternating pressure in at least two chambers, such as chambers of the pump or the compressor, as a result of a reciprocating movement of a bar element, wherein the bar element at respective ends is connected to a movable pressure chamber face being formed as a piston, wherein the bar element is reciprocally supported in a housing, and wherein the driving arrangement further comprises an electric motor that provides the reciprocating movement of the bar element;
    wherein the electric motor is an electric rotary motor;
    wherein the bar element extends through the rotor of the electric motor and that a rotational to linear transformation means is functionally connected between the bar element and the rotor of the motor, in such way that rotation of the rotor results in linear movement of the bar element;

wherein the rotor of the electric motor and the rotational to linear transformation means are arranged in a fluid chamber which is confined by at least said housing and said pistons and that the fluid chamber is filled with a liquid; and wherein the liquid is flowed past the rotor of the motor when the bar element reciprocates.

11. The driving arrangement according to claim 10, wherein the fluid chamber is pressurized to a higher pressure than a pressure on opposite sides of the pistons.

12. A pump assembly comprising:

two driving arrangements, wherein each driving arrangement is separately connected to two pumps or compressors;

wherein each of the two driving arrangements provides alternating pressure in chambers of said separately connected two pumps or compressors as result of a reciprocating movement of a respective bar element in each driving arrangement;

wherein the bar elements are reciprocally supported in a housing of the two driving arrangements and wherein each driving arrangement further comprises an electric motor that provides the reciprocating movement of the bar element, and wherein the bar elements of the two driving arrangements are run with a phase difference of 90 degrees in a constant reciprocating movement;

wherein the electric motor is an electric permanent magnet rotary motor;

wherein the two driving arrangements generate electric energy by use of their electric motor, at retardation of a movement of the electric rotary motor, the generated energy is transferred to the electric motor of the other driving arrangement in the pump assembly during an acceleration phase of another driving arrangement, or fed back to a power source;

wherein the bar elements extend through the rotor of the respective electric motor and a rotational to linear transformation means is functionally connected between the bar element and the rotor of the motor in such way that rotation of the rotor results in linear movement of the bar element;

wherein the bar elements are each connected to a pair of pistons or plungers, which pistons or plungers provide said alternating pressure; and wherein the two pumps or compressors are of a type adapted for pumping or compressing a fluid when driven by said alternating pressure.

13. The pump assembly according to claim 12, wherein acceleration of the bar elements and the electric motor, respectively, when moving between two end points of a reciprocating moving path of respective bar elements, always has an absolute value larger than zero.

14. The pump assembly according to claim 13, wherein the acceleration of the bar elements and the electric motor, respectively, when moving between the two end points of the reciprocating moving path of the respective bar elements exhibit a constant acceleration value.

15. The pump assembly according to claim 12, wherein the two driving arrangements are controlled on a basis of an actual behavior of another of the driving arrangements to maintain a constant sum of respective instantaneous speeds of the two driving arrangements.

* * * * *